Figure 1:
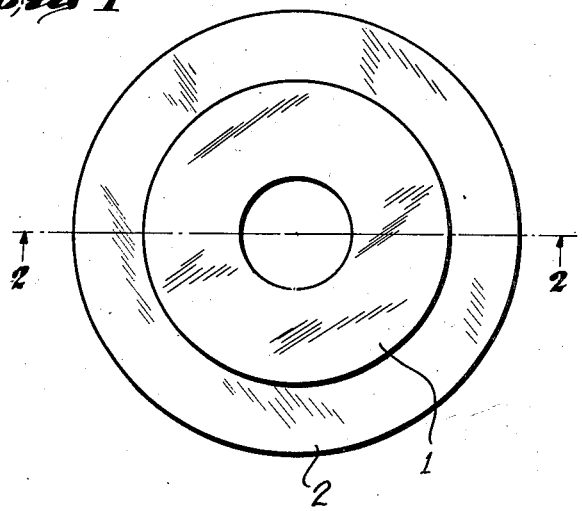

March 15, 1938. C. HAMBUECHEN 2,111,047
DEVICE FOR RECTIFYING ALTERNATING CURRENT
Filed Aug. 4, 1933

INVENTOR.
CARL HAMBUECHEN
BY Roy M. Eilers
ATTORNEY.

Patented Mar. 15, 1938

2,111,047

UNITED STATES PATENT OFFICE 2,111,047

DEVICE FOR RECTIFYING ALTERNATING CURRENT

Carl Hambuechen, Belleville, Ill., assignor to B-L Electric Manufacturing Company, St. Louis, Mo., a corporation of Missouri Application August 4, 1933, Serial No. 683,713

10 Claims. (Cl. 175—366)

My present invention relates primarily to rectifiers of the type described and claimed in my Patent No. 1,912,636 of June 6, 1933, and which employ rectifying couples or cells, each consisting of a copper sulfide element, and an element of magnesium, or other electropositive metal. In the above mentioned patent there is described a method of producing a rectifying and bonding material between the elements or electrodes, which consists in moistening the contacting surfaces of the elements to initiate electro-chemical action, the products of which, when properly dried and processed, bond the elements together. The rectifying material formed according to this method produces an integral junction between the electrode elements, which is shown by the fact that when the elements are pulled apart, surface portions of the magnesium adhere as a plating to the copper sulfide element. However, in many instances the copper sulfide element is not completely plated, there remaining spots or areas on such element to which the magnesium has not adhered, indicating that there has not been a complete and uniform rectifying junction formed between the elements. It is highly desirable to have a complete and uniform rectifying junction for the electrode elements in order to reduce the internal resistance and increase the efficiency and life of the couple.

I have discovered that when employing the so-called wet process for forming the rectifying couples, a greatly improved product is obtained by utilizing, instead of an electropositive element of pure magnesium, as described in my patent above referred to, an element of an electropositive metal, preferably magnesium, which contains a small percentage of manganese. The manganese aids in the production of an improved rectifying junction.

Another, and presently preferred method of constructing rectifying couples is to weld together a copper sulfide element and a metal element, preferably of magnesium or magnesium-manganese alloy, between which elements is disposed, prior to the welding operation, a relatively thin, highly resistant film of precipitated manganese. Such manganese coating is preferably formed in the following manner.

One side of a sheet of metal from which the electropositive elements are to be produced is rubbed down or polished with dry powdered pumice to remove any grease or oxide film, the surface on the reverse side of the sheet remaining untreated. The sheet is then immersed in a solution containing a manganese salt, for example manganese chloride, whereupon a relatively thin black coating of manganese is precipitated instantaneously, upon the rubbed surface. Practically no manganese is precipitated on the unrubbed or untreated surface. The sheet is removed from the solution, dried, and washers are punched therefrom. It will thus appear that the electropositive electrode elements embodies a metal body, preferably of magnesium or magnesium-manganese alloy having a thin film of precipitated manganese disposed on one side surface. The precipitated manganese film is a very poor conductor of electricity, and in fact may be classed as an insulator.

The copper sulfide elements may be conveniently produced by subjecting heated copper washers to the action of sulfur vapors until sulfiding of the washers is completed.

In forming up the couple, the copper sulfide element is pressed against the manganese film of the electropositive element with pressure sufficient to cause the copper sulfide to permeate, or substantially flow through the pores, or interstices of the precipitated manganese film. While so compressed, current is pased through the couple in a so-called bucking direction, i. e., from the metal to the copper sulfide element, which is opposite to the direction of current flow when the couple is functioning as a rectifier. The adjacent surface portions of the elements become fused, due to the intense heat produced at the highly resistant manganese film, and react, probably electro-thermically, to form a rectifying material of slag-like appearance, which welds the elements together. The reason for passing the current through the elements in a bucking or inverse direction is that fusing temperatures are rapidly produced, and the heat is substantially localized at the contacting surfaces of the elements where fusion is desired.

Figure 2:
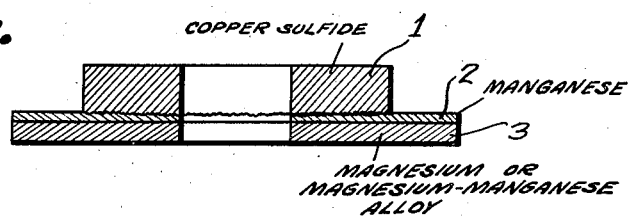

The accompanying drawing illustrates a rectifying couple constructed in accordance with the teachings of the present invention. Fig. 1 is a plan view of the couple, the individual elements thereof being in the shape of circular washers. Fig. 2 is a transverse sectional view taken at line 2—2 of Fig. 1. In the drawing, reference numeral 1 designates the electro-negative electrode element of copper-sulfide which is welded in the manner described to the manganese coated surface 2 of the electro-positive electrode element 3 of magnesium or magnesium-manganese alloy.

I claim:

1. In an electrical rectifier, a rectifying couple comprising a copper sulfide element, a magnesium-manganese alloy element, and a layer of precipitated manganese between said elements.

2. A rectifying couple comprising a copper sulfide element and a magnesium element having a preformed coating of precipitated manganese in contact with the copper sulfide element.

3. The process of making rectifying couples for current rectifiers which includes precipitating a layer of manganese on a magnesium body, placing a copper sulfide body in contact with the said layer and pressing the bodies together with sufficient force to cause the copper sulfide to impregnate the said layer.

4. The process of making electropositive electrode elements for current rectifiers which consists in treating a surface of a magnesium sheet to remove therefrom any oxide film, and in immersing said sheet in a solution containing a manganese salt to cause a film of manganese to form on said treated surface.

5. The method of making current rectifiers which consists in electrochemically depositing manganese on a surface of a magnesium or magnesium alloy element, placing a copper sulfide element in contacting adjacence with the said manganese, and in passing sufficient current through said elements to form a welded junction therebetween.

6. The method of making electrical rectifiers which consists in forming a manganese coating or film on one surface of a magnesium element, placing a copper sulfide element in contacting adjacence with the coated surface of said magnesium element, and passing current through said elements to form a rectifying and bonding slag therebetween.

7. The method of making electrical rectifiers which consists in forming, by precipitation, a manganese coating or film on only one side surface of a magnesium element, in disposing the coated surface of said element in contacting adjacence with a copper sulfide element, in pressing said elements together to cause the copper sulfide to permeate the magnesium layer, and in passing current from said magnesium to said copper sulfide element to weld said elements together.

8. The process of making a dry surface contact rectifier which comprises the steps of producing a metallic manganese coating on a surface of a relatively light electropositive metal, contacting such coating with a dense mass of a current conducting compound of the oxygen family of the sixth periodic group having electro-negative characteristics, and passing a forming current through the elements so joined.

9. The process of making a dry surface contact rectifier which comprises the steps of producing a metallic manganese coating on one face of an aluminum element, establishing an electrical contact of a body of cuprous sulphide with said manganese coating, and passing a forming current through the members thus assembled to produce a conversion of the metallic manganese film to a compound thereof having asymmetric current conducting characteristics.

10. The process of making a dry surface contact rectifier which comprises the steps of producing a metallic manganese coating on one face of an aluminum element, establishing an electrical contact of a body of cuprous sulphide with said manganese coating, and passing a forming current through the members thus assembled to produce a conversion of the metallic manganese film to a compound thereof which is intimately united with said plate and forms therewith an asymmetric current conducting couple.

CARL HAMBUECHEN.